March 30, 1926.  
J. L. LAGORIO  
COMBINATION GARDEN TOOL  
Filed Nov. 12, 1923

1,578,532

INVENTOR.
John L. Lagorio
BY
ATTORNEY

Patented Mar. 30, 1926.

1,578,532

UNITED STATES PATENT OFFICE.

JOHN L. LAGORIO, OF STOCKTON, CALIFORNIA.

COMBINATION GARDEN TOOL.

Application filed November 12, 1923. Serial No. 674,192.

*To all whom it may concern:*

Be it known that I, JOHN L. LAGORIO, a citizen of the United States, residing at Stockton, county of San Joaquin, State of California, have invented certain new and useful Improvements in Combination Garden Tools; and I do declare the following to be a full, clear, and exact description of the same, reference being had to the accompanying drawings, and to the characters of reference marked thereon, which form a part of this application.

This invention relates to a novel garden tool or implement, my main object being to provide a tool of this character which combines in a single unit, a spade, a shovel, a hoe, a rake, a pitchfork, and a digging fork.

I have in mind particularly to make this tool in miniature sizes, for a child's use and plaything, but it may also be made in an ordinary commerical size for use by home-owners or tenants in their gardens, enabling them to buy a single tool to take the place of the plurality of tools now necessary and at a cost but little greater than any one of such tools.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Figs. 1, 2, 3, and 4 are perspective views of the tool, showing the ground working member set relative to the handle to serve as a rake, a hoe, a spade and a digging fork respectively.

Figure 1:
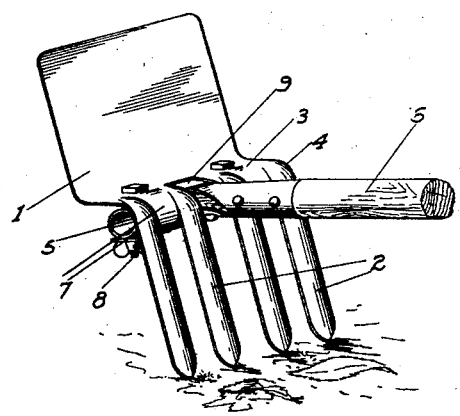

Referring now more particularly to the characters of reference on the drawings, the numeral 1 denotes a flat and rigid blade member of suitable area forming a digging or hoeing element, and having formed integral therewith, at a plane offset therefrom but parallel thereto, a plurality of tines or prongs 2 forming fork or rake teeth as the case may be.

The connecting strip or web 3 between the blade and tine portions is curved adjacent its junction with the tines as at 4 to serve as a seat for the tubular head 5 of a handle 6, said head projecting at right angles to the handle and extending an equal distance on both sides thereof.

Figure 5:
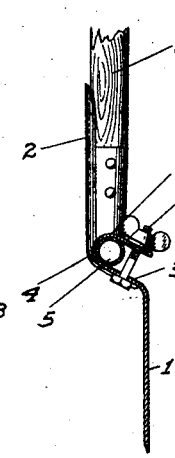
Fig. 5 is a section on the line 5—5 of Fig. 3.
Figure 4:
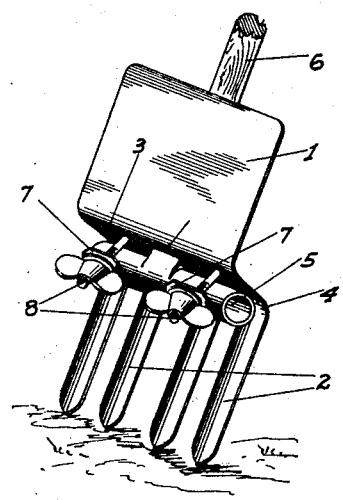
Figure 6:
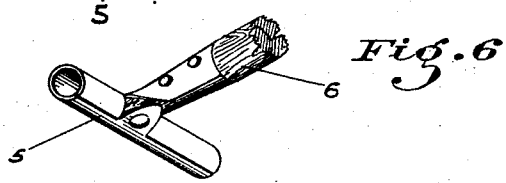
Fig. 6 is a detached fragmentary perspective view of the handle member.

Ears or lugs 7, formed integral with the blade 1, and located between certain of the tines 2, are bent to partially surround the head to serve as bearings therefor, and then extended at a tangent to and beyond the head to receive adjustable clamping screws 8 therewith, which also extend through the strip 3, as plainly shown in Figs. 4 and 5. The blade and tine members, and consequently the ears 7, are made of steel, and the clamping lugs or ears 7 therefore while sufficiently rigid not to be easily bent, have a certain amount of springy flexibility, causing them to clamp the head 5 against movement when the bolts 8 are tightened up, but enabling them to move away from the head so that the latter is free to turn, when said bolts are loosened.

The handle 6 is located in a plane centrally between the opposite edges of the blade 1, and the tines 2 are so disposed and spaced that the handle may pass between the two centrally located tines.

To enable the handle to lie close against one face of the blade 1 when desired, the member 3 is cut away for the necessary distance in the plane of movement of the handle, as shown at 9.

In order to strengthen the tines while maintaining them relatively light, they are made of curved cross section, the curvature being concave relative to the head-seat 4 and extending therebeyond.

In operation, it is only necessary to turn or adjust the handle so that the blade or tines are in the desired position relative to the handle, for the particular work to be done, and then tighten up the clamping bolts.

For instance, to use the tool as a rake, the handle is adjusted so that it forms an angle of 90° or less with the tines, as shown in Fig. 1. To enable the implement to function as a digging fork, the handle is turned between the tines from the position shown in Fig. 1, to a position adjacent one face of the blade 1 and substantially parallel to the tines, as shown in Fig. 4.

Figure 2:
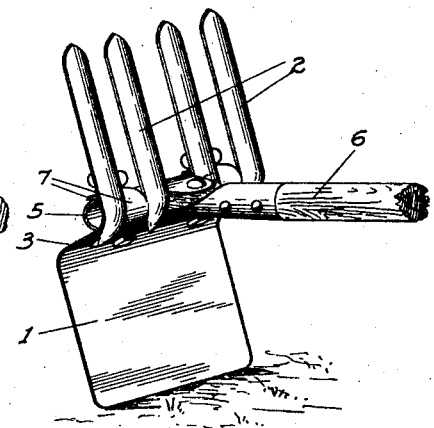
Figure 3:
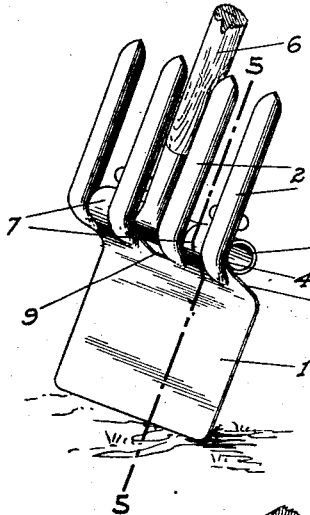

To use the tool as a hoe, the tool is reversed in position from what is shown in Fig. 1, and the handle set at the desired acute angle relative to the blade 1, as shown in Fig. 2. For spading purposes, the handle is turned to lie between and substantially parallel to the tines, as shown in Fig. 3.

It will therefore be evident that any desired setting of the ground working members relative to the handle may be easily and quickly obtained, without ever having to remove the handle.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A combination tool including two opposed working elements, each disposed in a plane offset from the other, an interconnecting web between the adjacent edges thereof, a handle having a cross head adapted to extend lengthwise of the web, and curved elements connected to the web in spaced relation to each other and projecting outwardly from one side thereof to form, with said web, bearing means for the crosshead.

2. A combination tool including two opposed working elements, each disposed in a plane offset from the other, an interconnecting web between the adjacent edges thereof, a handle having a cross head adapted to turnably engage the web, and means provided integral with the web for forming, with said web, clampable bearing elements to engage the crosshead and normally prevent turning thereof.

3. A combination tool comprising a flat sheet metal element bent at its center to form a web connecting opposed ends of the sheet each disposed in a plane offset from the other, one end having longitudinal strips cut out therefrom and bent over the center web to form bearing elements and a handle having a cross head turnable in the bearings.

In testimony whereof I affix my signature.

JOHN L. LAGORIO.